United States Patent
Csatari

(10) Patent No.: US 10,860,436 B2
(45) Date of Patent: Dec. 8, 2020

(54) SNAPSHOT CREATION IN VIRTUAL NETWORK ENVIRONMENT

(71) Applicant: Nokia Solutions and Networks Oy, Espoo (FI)

(72) Inventor: Gergely Csatari, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/098,531

(22) PCT Filed: May 2, 2016

(86) PCT No.: PCT/EP2016/059755
§ 371 (c)(1),
(2) Date: Nov. 2, 2018

(87) PCT Pub. No.: WO2017/190758
PCT Pub. Date: Nov. 9, 2017

(65) Prior Publication Data
US 2019/0138400 A1 May 9, 2019

(51) Int. Cl.
*G06F 12/00* (2006.01)
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1484* (2013.01); *G06F 2009/45562* (2013.01); *G06F 2201/84* (2013.01)

(58) Field of Classification Search
CPC ............ G06F 11/1464; G06F 9/45558; G06F 11/1484; G06F 2009/45562; G06F 2201/84
See application file for complete search history.

(56) References Cited

U.S. PATENT DOCUMENTS

| | | | |
|---|---|---|---|
| 2009/0216816 A1* | 8/2009 | Basler | G06F 11/1464 |
| 2010/0011178 A1* | 1/2010 | Feathergill | G06F 11/1466 711/162 |
| 2011/0113206 A1 | 5/2011 | Heim | 711/162 |
| 2011/0289345 A1* | 11/2011 | Agesen | G06F 11/2097 714/4.11 |
| 2012/0195187 A1* | 8/2012 | Ashihara | H04L 12/56 370/220 |

(Continued)

FOREIGN PATENT DOCUMENTS

| | | |
|---|---|---|
| JP | 2014518424 A | 7/2014 |
| JP | 2015526830 A | 9/2015 |
| JP | 5904514 B1 | 4/2016 |

*Primary Examiner* — Arvind Talukdar
(74) *Attorney, Agent, or Firm* — Harrington & Smith

(57) ABSTRACT

There are provided measures for enabling/realizing efficient snapshot creation in virtual network environment, especially for ensuring creation of consistent snapshots in an automated manner. Such measures exemplarily comprise that a virtual manager entity provides a notification of requested snapshot creation of a resource of a virtual machine entity for the virtual machine entity, the virtual machine entity executes snapshot preparation processing in response to the snapshot creation notification from the virtual manager entity, and the virtual manager entity executes snapshot processing on the basis of a snapshot preparation result provided by the virtual machine entity.

20 Claims, 8 Drawing Sheets

(56) References Cited

U.S. PATENT DOCUMENTS

| | | | |
|---|---|---|---|
| 2012/0323853 A1 | 12/2012 | Fries et al. | 707/649 |
| 2013/0067277 A1* | 3/2013 | Mummidi | G06F 11/2097 714/19 |
| 2013/0097120 A1* | 4/2013 | Mummidi | G06F 16/21 707/649 |
| 2014/0115583 A1* | 4/2014 | Lee | H04W 4/60 718/1 |
| 2014/0149695 A1* | 5/2014 | Zaslaysky | G06F 12/16 711/162 |
| 2015/0154081 A1* | 6/2015 | Javadekar | G06F 11/2097 707/639 |
| 2015/0378783 A1* | 12/2015 | Tarasuk-Levin | G06F 16/273 718/1 |
| 2016/0320978 A1* | 11/2016 | Barve | G06F 3/065 |
| 2017/0177441 A1* | 6/2017 | Chow | G06F 11/1451 |
| 2017/0262299 A1* | 9/2017 | Chow | G06F 9/455 |

\* cited by examiner

SNAPSHOT CREATION IN VIRTUAL NETWORK ENVIRONMENT

This patent application is a U.S. National Stage application of International Patent Application Number PCT/EP2016/059755 filed May 2, 2016, which is hereby incorporated by reference in its entirety.

FIELD

The present invention relates to snapshot creation in virtual network environment. More specifically, the present invention relates to measures (including methods, apparatuses and computer program products) for enabling/realizing snapshot creation in virtual network environment.

BACKGROUND

Recently, network virtualization is a trend in communication technology. By way of network virtualization, conventional networks and their network elements are virtualized, i.e. implemented in a virtual network environment. For example, this means that a functionality of a network element can be virtualized in a virtual machine, which is realized on common-purpose computing equipment, by means of a guest system (representing the actual functionality of the network element) being hosted by a host system (representing the underlying basic functionality of the computing equipment).

Generally, especially as used herein, network virtualization and cloud computing can be considered as being basically equivalent. This is because network virtualization can leverage modern technologies such as those developed for cloud computing, since virtualization mechanisms are at the core of these cloud technologies. Hence, virtual network environment and cloud or cloud network environment are to be regarded as synonymous.

In the context of network virtualization, the migration of network elements in combination with software defined networking (SDN) is capable of transforming networks into a fully software-defined infrastructure that is both highly efficient and flexible. Similarly, a fully software-defined infrastructure can also be achieved by the migration of network elements in combination with network functions virtualization (NFV). Accordingly, a software defined networking (SDN) architecture and/or a network functions virtualization (NFV) architecture is recently being adopted in mobile and/or fixed communication systems, including e.g. any kind of 3GPP systems. Standardization of network virtualization is driven e.g. by the European Telecommunications Standards Institute (ETSI).

In thus emerging virtual network environments, various new features are established. One of these new features is the snapshot feature which enables to take "snapshots" of the state of a virtual machine by the hypervisor of the virtual machine. Taking a snapshot includes generating a dump of a storage disk or a memory of a virtual machine, especially the guest system thereof.

Creating storage disk and/or memory snapshots in a virtual network environment eases the backup/recovery and debugging. More specifically, storage disk snapshots of a virtual machine can be used as backup/recovery point for backing up or recovering the thus snapshotted state of the virtual machine, while memory snapshots of a virtual machine can exemplarily be used for debugging applications running on the virtual machine.

However, in order to fulfill such purposes, it is necessary that the thus created snapshots are consistent. Consistency of a snapshot is extremely important in case of clustered file systems, but also in case of a single storage disk or memory. Before a storage disk and/or memory snapshot is created, the virtual machine (especially the guest system thereof) is thus to be prepared accordingly so that consistency can be ensured. In conventional systems, such preparation requires manual action by a user, which is cumbersome, inefficient and prone to errors or ambiguities.

Accordingly, there is a demand for enabling/realizing efficient snapshot creation in virtual network environment, especially creation of consistent snapshots of a resource of a virtual machine of a virtual network environment in an automated manner.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising providing, by a virtual manager entity of a virtual network environment, a notification of requested snapshot creation of a resource of a virtual machine entity in the virtual network environment for the virtual machine entity, obtaining, at the virtual manager entity, a result of snapshot preparation processing by the virtual machine entity, and executing, by the virtual manager entity, snapshot processing on the basis of the obtained snapshot preparation result.

According to an example aspect of the present invention, there is provided a method comprising obtaining, at a virtual machine entity of a virtual network environment, a notification of requested snapshot creation of a resource of the virtual machine entity from a virtual manager entity of the virtual network environment, executing, at the virtual machine entity, snapshot preparation processing in response to the snapshot creation notification, and issuing, by the virtual machine entity, a result of the snapshot preparation processing for the virtual manager entity.

According to an example aspect of the present invention, there is provided an apparatus comprising at least one processor and at least one memory including a computer program code, wherein the at least one memory and the computer program code are configured, with the at least one processor, to cause the apparatus to perform at least the following: providing, by a virtual manager entity of a virtual network environment, a notification of requested snapshot creation of a resource of a virtual machine entity in the virtual network environment for the virtual machine entity, obtaining, at the virtual manager entity, a result of snapshot preparation processing by the virtual machine entity, and executing, by the virtual manager entity, snapshot processing on the basis of the obtained snapshot preparation result.

According to an example aspect of the present invention, there is provided an apparatus comprising at least one processor and at least one memory including a computer program code, wherein the at least one memory and the computer program code are configured, with the at least one processor, to cause the apparatus to perform at least the following: obtaining, at a virtual machine entity of a virtual network environment, a notification of requested snapshot creation of a resource of the virtual machine entity from a virtual manager entity of the virtual network environment, executing, at the virtual machine entity, snapshot preparation processing in response to the snapshot creation notification, and issuing, by the virtual machine entity, a result of the snapshot preparation processing for the virtual manager entity.

According to an example aspect of the present invention, there is provided a computer program product comprising (computer-executable) computer program code which, when the program code is executed (or run) on a computer or the program is run on a computer (e.g. a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, efficient snapshot creation in virtual network environment can be enabled/realized. More specifically, creation of consistent snapshots of a resource of a virtual machine of a virtual network environment in an automated manner can be ensured.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
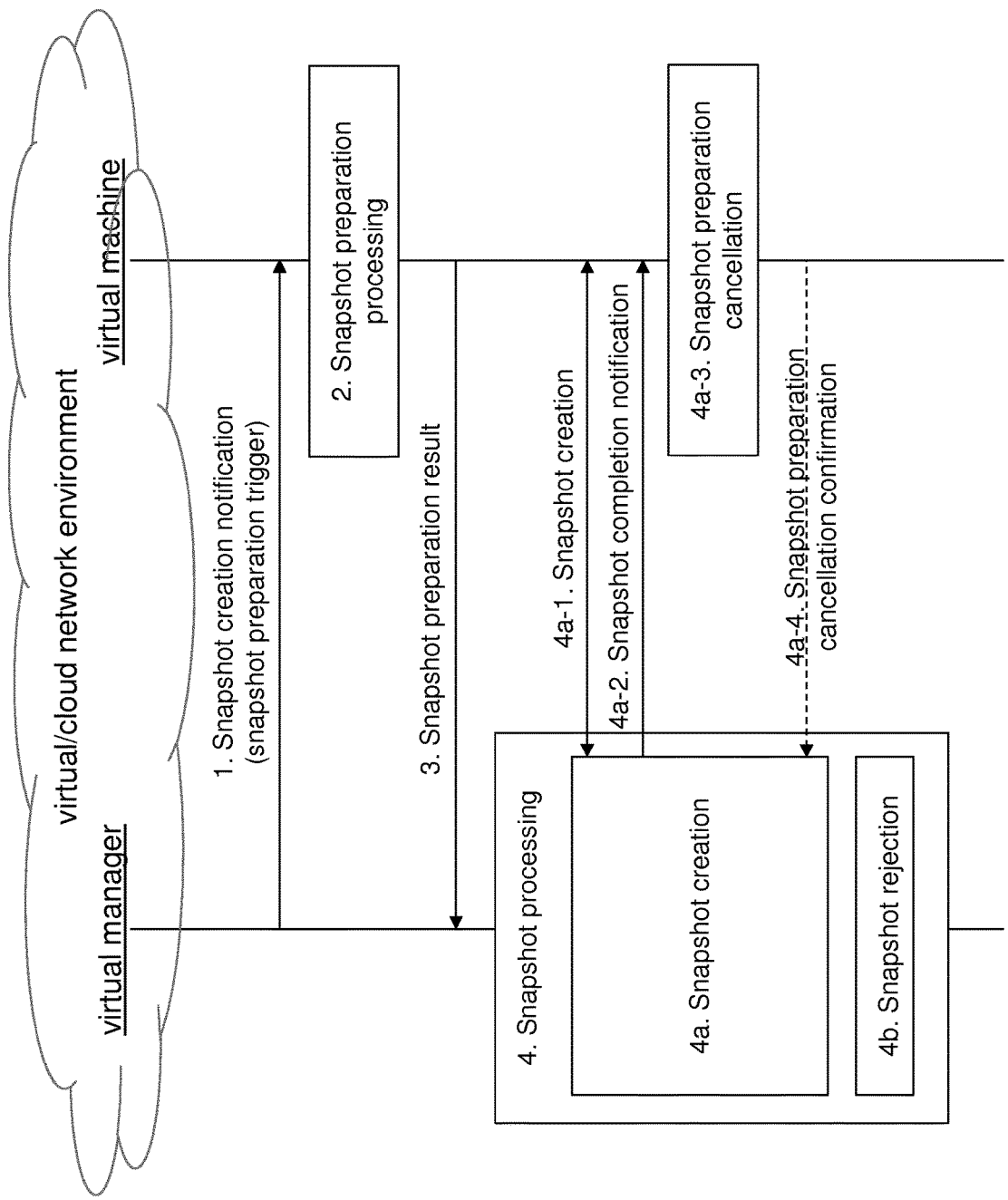
FIG. 1 shows a flow diagram illustrating an example of a procedure according to at least one exemplifying embodiment of the present invention.

The present invention is described herein with reference to particular non-limiting examples and to what are presently considered to be conceivable embodiments of the present invention. A person skilled in the art will appreciate that the present invention is by no means limited to these examples and embodiments, and may be more broadly applied.

It is to be noted that the following description of the present invention and its embodiments at least partly refers to specifications being used as non-limiting examples for certain exemplifying deployments of network virtualization and/or underlying communication networks. Namely, the present invention and its embodiments are mainly described in relation to ETSI NFV specifications and 3GPP specifications being used as non-limiting examples. It is noted that the present disclosure is generally applicable to any kind of network virtualization technology as well as any kind of underlying communication system, including e.g. 3GPP and non-3GPP 4G, 5G systems and onwards, such as systems of LTE Release 13, 14 and onwards. As such, the description of exemplifying embodiments given herein specifically refers to terminology which is directly related thereto.

Such terminology is only used in the context of the presented non-limiting examples and embodiments, and does naturally not limit the invention in any way. Rather, any other system configuration or deployment may equally be utilized as long as complying with what is described herein and/or exemplifying embodiments described herein are applicable to it. For example, a virtual manager entity and a virtual machine entity described therein may by any entity, apparatus or device suitable for realizing the thus described operability, irrespective of its implementation or related standard, respectively.

Hereinafter, various exemplifying embodiments and implementations of the present invention and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling/realizing efficient snapshot creation in virtual network environment, especially creation of consistent snapshots of a resource of a virtual machine of a virtual network environment in an automated manner.

FIG. 1 shows a flow diagram illustrating an example of a procedure according to at least one exemplifying embodiment of the present invention.

In the exemplary procedure of FIG. 1, an entity denoted as virtual manager cooperates with an entity denoted as virtual machine in a virtual/cloud network environment. The virtual machine represents any virtual machine entity (including software and/or hardware) capable of virtualizing a network element or a functionality of a network element of an underlying communication network, and may have a host system (representing the basic functionality of the computing equipment upon which the virtual machine entity is realized) and a guest system (representing the actual functionality of the network element being virtualized) which is hosted by the host system. The virtual manager represents any virtual manager entity (including software and/or hardware) capable of (directly or indirectly) managing or controlling the virtual machine entity.

As shown in FIG. 1, an exemplary procedure according to at least one exemplifying embodiment of the present invention may comprise the following operations.

In step 1, a notification of requested snapshot creation of a resource of the virtual machine (also referred to as snapshot creation notification) is provided from the virtual manager to the virtual machine. As such snapshot creation notification is operable as trigger for initiating snapshot preparation processing at the virtual machine, it can also be regarded or referred to as snapshot preparation trigger. As outlined below, the snapshot creation notification can be triggered by an event at the virtual manager or another entity communicatively coupled to the virtual manager. So, the virtual manager can either initiate/generate or forward/transfer the snapshot creation notification, and provision of the snapshot creation notification for the virtual machine by the virtual manager comprises initiation/generation thereof and forwarding/transferring thereof.

In the context of provision of the snapshot creation notification, the virtual manager may obtain a request for snapshot creation and identify at least one of the virtual machine, the resource for snapshot creation and another entity for transferring the notification towards the virtual machine entity on the basis of the obtained request. This applies for both cases of initiation/generation and forwarding/transferring of the snapshot creation notification by the virtual manager. In the case of initiation/generation of the snapshot creation notification by the virtual manager, the request may be obtained from an automatic or manual event, which may occur internal or external to the virtual manager. In the case of forwarding/transferring of the snapshot creation notification by the virtual manager, the request may be obtained from an upstream entity such as a notification-originating/generating virtual manager or an intermediate virtual manager.

In step 2, a snapshot preparation processing is executed by the virtual machine in response to the snapshot creation notification (acting as trigger for initiating snapshot preparation processing). In this regard, the virtual machine may determine whether or not preparation for the requested snapshot and creation of the requested snapshot are acceptable. For such determination, various factors may be considered, such as e.g. the current operating state of the virtual machine (or, at least, the resource subject to requested snapshot creation), the authorization of the snapshot-requesting or notification-providing entity, or the like. Depending on the outcome of the determination, the snapshot preparation processing may comprise either performing preparation for the requested snapshot creation in case of acceptability (of both snapshot preparation and creation) or denying preparation for the requested snapshot creation in case of non-acceptability (of snapshot preparation and/or creation). When the virtual machine has performed preparation for snapshot creation, it can be regarded as being shifted to and thus operating in a snapshot preparation mode (rather than a previously prevailing normal operation mode).

In step 3, a result of the snapshot preparation processing is issued from the virtual machine to the virtual manager. Depending on the outcome of the determination and the thus executed snapshot preparation processing in step 2, the virtual machine provides to the virtual manager either a (positive-response) snapshot preparation result indicating that the virtual machine has performed preparation for the requested snapshot creation (in case of acceptability of both snapshot preparation and creation) or a (negative-response) snapshot preparation result indicating that the virtual machine has denied preparation for the requested snapshot creation (in case of non-acceptability of snapshot preparation and/or creation).

In step 4, a snapshot processing is executed by the virtual manager in response to the snapshot preparation result. Depending on the indication of the snapshot preparation result, the virtual manager executes either snapshot creation (step 4a) in case of the snapshot preparation being performed by the virtual machine or snapshot rejection (step 4b) in case of the snapshot preparation being denied by the virtual machine.

For snapshot creation, the virtual manager performs creation of the requested snapshot at the virtual machine (step 4a-1) and provision of a notification of completed snapshot creation (also referred to as snapshot completion notification) after creating the requested snapshot to the virtual machine (step 4a-2). In step 4a-1, the requested snapshot is created in cooperation between the virtual manager and the virtual machine, wherein the virtual manager or another entity under management or control of the virtual manager may operate as hypervisor (or similar entity) of the virtual machine.

In step 4a-2, the virtual machine obtains the snapshot completion notification, and then, in step 4a-3, the virtual machine executes snapshot preparation cancellation in response to the snapshot completion notification. When the virtual machine has cancelled preparation for snapshot creation, it can be regarded as being shifted to and thus operating in the normal operation mode again (rather than the previously prevailing snapshot preparation mode).

Thereupon, in step 4a-4, the virtual machine may optionally provide a notification of cancellation of snapshot preparation (also referred to as snapshot preparation cancellation notification) to the virtual manager in order to notify the virtual manager that the virtual machine operates normally again. Based thereon, the virtual manager may optionally inform another entity communicatively coupled to the virtual manager (such as e.g. an entity where or by which the notification of step 1 has been triggered) accordingly.

For snapshot rejection, the virtual manager rejects the requested snapshot or, stated in other words, rejects the request for creation of the snapshot underlying the snapshot creation notification of step 1. Such rejection may optionally comprise informing another entity communicatively coupled to the virtual manager (such as e.g. an entity where or by which the notification of step 1 has been triggered) accordingly.

Generally, the requested snapshot may refer to any resource of the virtual machine, including e.g. a storage disk or a memory thereof. In brief, the resource subject to requested snapshot creation may comprise a storage disk or a memory of the virtual machine. In particular, the resource subject to requested snapshot creation may belong to the guest system of the virtual machine such as a guest's operating system and/or application/s (i.e. the part of the virtual machine's system, which relates to a functionality of a network element virtualized in the virtual machine). Accordingly, the snapshot of such resource may contain or image/mirror all or a part of information present in such resource at the time of snapshot creation. In case of virtualization of a network element of an underlying communication network, such information being snapshotted may comprise any information relating to a network element virtualized in the virtual machine entity, such as one or more of virtual links, data, and control and/or management planes to other related virtualized network elements. For example, when a snapshot is intended to be used as a recovery point, at minimum, virtual links, data, and control and/or management planes to other related virtualized network elements (such as e.g. VNFs or VNF components) are to be recovered and are thus to be contained or imaged/mirrored by such snapshot.

The specifics of the snapshot preparation and the snapshot preparation cancellation, as described above in steps 2 and 4a-3 of FIG. 1, may differ depending on the target resource of the requested snapshot. For example, when the resource subject to requested snapshot creation comprises a storage disk, preparation for the requested snapshot may comprise at least one of flushing one or more caches to the storage disk, disabling write operations to the storage disk and configuring clusters of a clustered file system of the virtual machine (i.e. configuration of storage clusters of cluster filesystems (e.g. CephFS, GlusterFS)), while cancellation of (corresponding) preparation for the requested snapshot may comprise at least enabling write operations to the storage disk. For example, when the resource subject to requested snapshot creation comprises a memory, preparation for the requested snapshot may comprise at least disabling write operations to the memory, while cancellation of (corresponding) preparation for the requested snapshot may comprise at least enabling write operations to the memory. That is, in both cases of the resource subject to requested snapshot creation comprising a storage disk and a memory, write operations are prevented in the snapshot preparation mode, while write operations are allowed in the normal operation mode.

In the following, example procedures according to exemplifying embodiments of the present invention are described, which are implementation-independent and are thus generally applicable under any architectural framework, i.e. any network virtualization system. Accordingly, the thus illustrated reference point IaaS is also to be considered as a mere example, while any reference point/s or interface/s between any suitable entities are generally applicable for executing the exemplified procedure.

As an example, the virtual manager is exemplarily assumed to be represented by/at a cloud (representing any one or more cloud entities), and the virtual machine is exemplarily assumed to be represented by/at the virtual machine VM x (which could also be realized in a or by a cloud or cloud entity, either in the same or a different cloud as the virtual manager). Yet, it is noted that exemplifying embodiments of the present invention are not limited to such configuration.

Figure 2:
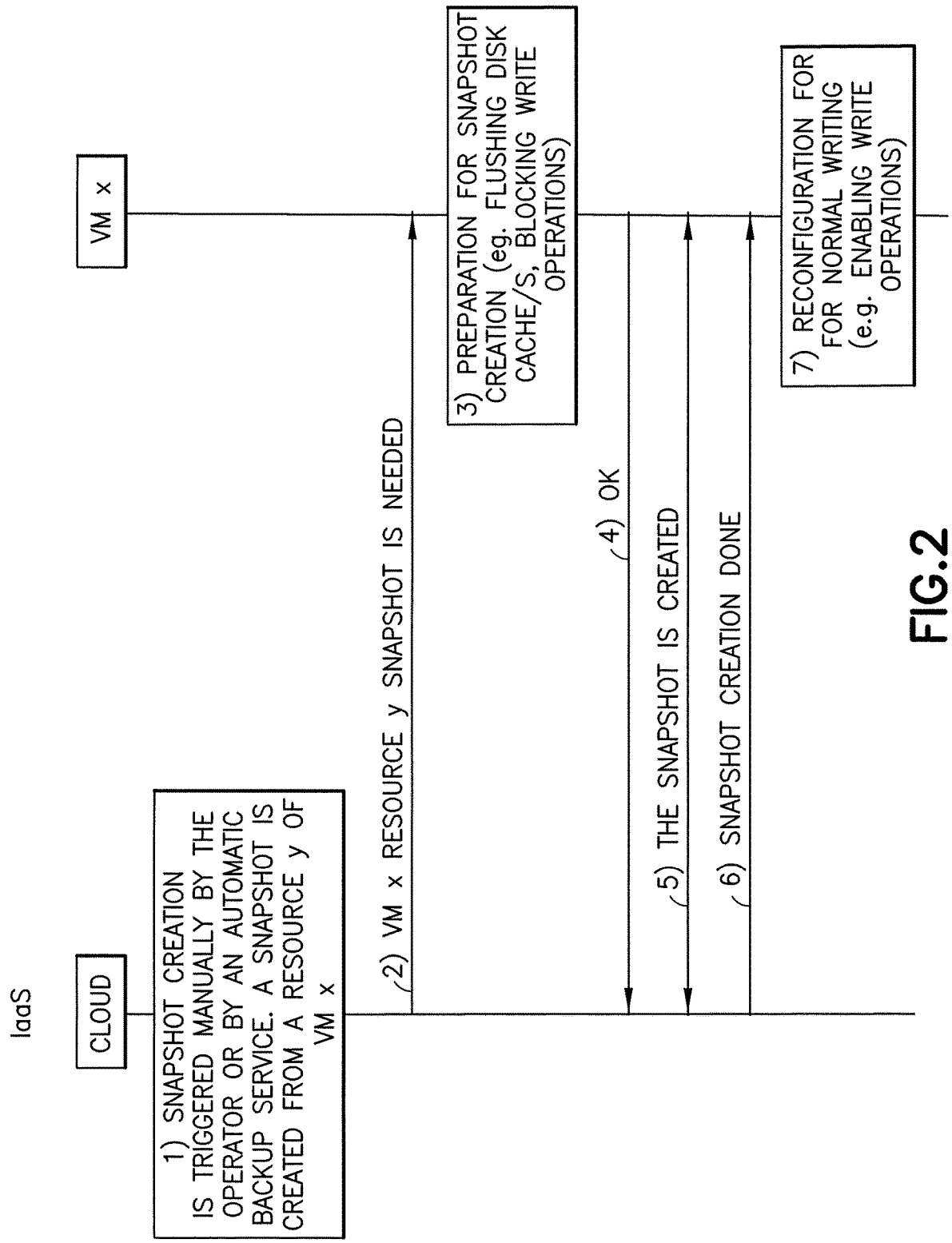
FIG. 2 shows a flow diagram illustrating a first example of a procedure, which is applicable under any architectural framework, according to at least one exemplifying embodiment of the present invention.

FIG. 2 shows a flow diagram illustrating a first example of a procedure, which is applicable under any architectural framework, according to at least one exemplifying embodiment of the present invention. The exemplary procedure of FIG. 2 refers to successful snapshot creation in a case of direct communication between the virtual manager and the virtual machine.

As shown in FIG. 2, an exemplary procedure of successful snapshot creation according to at least one exemplifying embodiment of the present invention may comprise the following operations.
1) Snapshot creation is triggered in the VIM/cloud. Such trigger may occur either by an automatic event, e.g. via the API of the VIM/cloud, or a manual (human-triggered) event. In this example, the trigger (or request) refers, at least, to a requested snapshot of a resource y of VM x.
2) The VIM/cloud notifies the VM x about the requested snapshot creation by way of a snapshot creation notification. The identifier of the virtual machine in question (here, the identifier of VM x) and/or, at least, (an identifier or denomination of) the resource to be snapshotted (here, resource y) is contained or referenced in the notification.
3) The VM x performs preparation for the requested snapshot creation, since it is assumed here that snapshot creation and preparation are acceptable. The actual steps of the related snapshot preparation processing are dependent from the architecture of the target virtual machine for the requested snapshot creation, i.e. the VM, and/or the target resource or target resource type.
4) In this example, it is assumed that the applicable snapshot preparation processing is successfully performed such that the VM x is shifted to the snapshot preparation mode. Hence, the VM x sends back an acknowledgement of the snapshot creation/preparation, i.e. a positive-response snapshot preparation result ("OK"), to the VIM/cloud.
5) Based on the positive-response snapshot preparation result ("OK"), the VIM/cloud performs snapshot creation. That is, the VIM/cloud causes that the requested snapshot is created with respect to resource y of VM x, as well as other resources/VMs, if any.
6) After creation of the requested snapshot, the VIM/cloud sends a notification about the completion of snapshot creation, i.e. a snapshot completion notification, to the VM x.
7) Based on the snapshot completion notification, the VM x performs reconfiguration for normal operation. That is, the VM x performs snapshot preparation cancellation such that the VM x is shifted to the normal operation mode.

Figure 3:
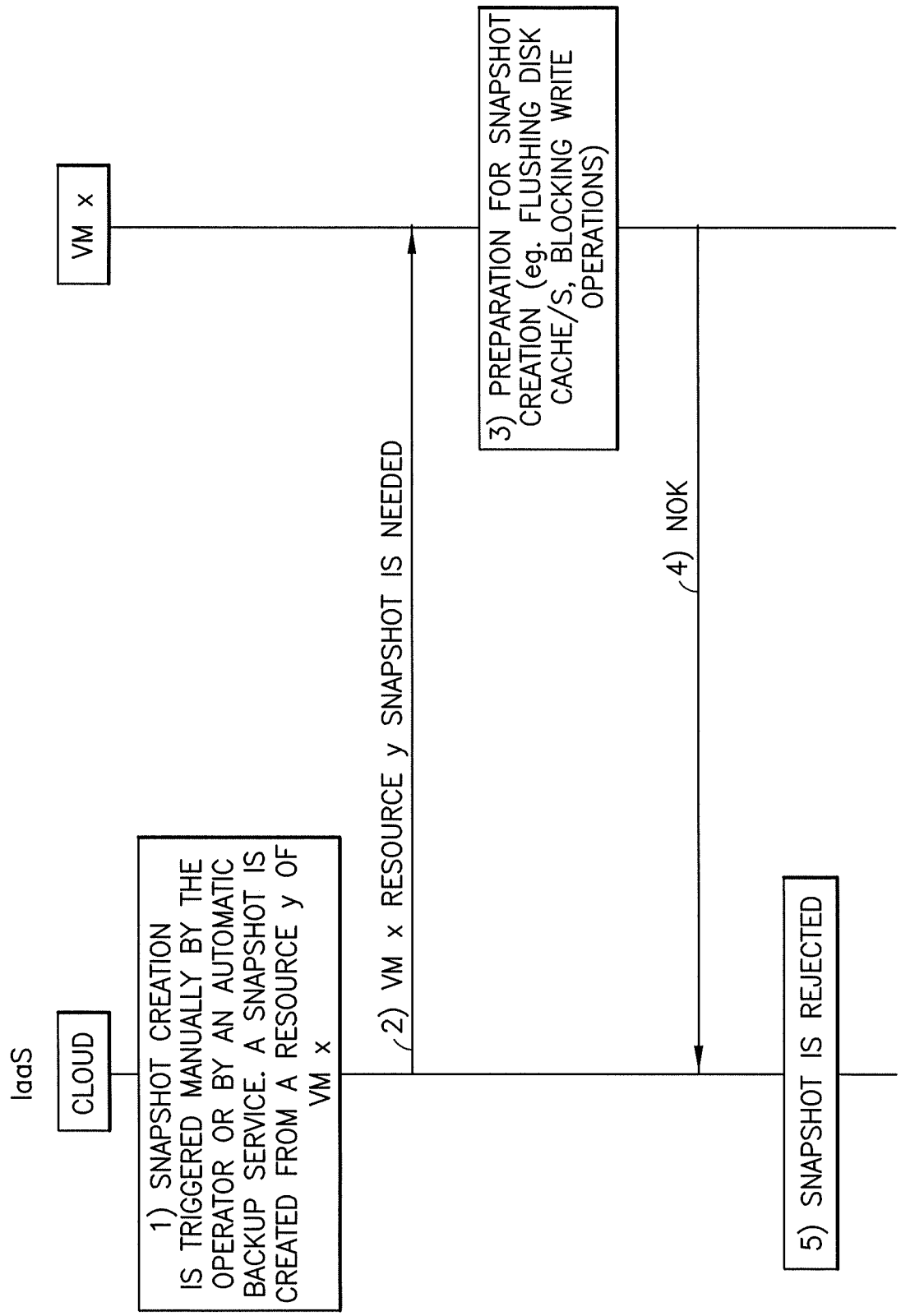
FIG. 3 shows a flow diagram illustrating a second example of a procedure, which is applicable under any architectural framework, according to at least one exemplifying embodiment of the present invention.

FIG. 3 shows a flow diagram illustrating a second example of a procedure, which is applicable under any architectural framework, according to at least one exemplifying embodiment of the present invention. The exemplary procedure of FIG. 3 refers to rejected snapshot creation in a case of direct communication between the virtual manager and the virtual machine.

As shown in FIG. 3, an exemplary procedure of successful snapshot creation according to at least one exemplifying embodiment of the present invention may comprise the following operations.
1) Snapshot creation is triggered in the VIM/cloud. Such trigger may occur either by an automatic event, e.g. via the API of the VIM/cloud, or a manual (human-triggered) event. In this example, the trigger (or request) refers, at least, to a requested snapshot of a resource y of VM x.
2) The VIM/cloud notifies the VM x about the requested snapshot creation by way of a snapshot creation notification. The identifier of the virtual machine in question (here, the identifier of VM x) and/or, at least, (an identifier or denomination of) the resource to be snapshotted (here, resource y) is contained or referenced in the notification.

3) The VM x denies preparation for the requested snapshot creation, since it is assumed here that snapshot creation and/or preparation are not acceptable. Such non-acceptability may result from an ongoing operation, such as a write operation, which must or should not be interrupted, or a lack of authorization.
4) In this example, it is assumed that the applicable snapshot preparation processing is not performed such that the VM x is not shifted to the snapshot preparation mode but remains in the normal operation mode. Hence, the VM x sends back a disapproval of the snapshot creation/preparation, i.e. a negative-response snapshot preparation result ("NOK"), to the VIM/cloud.
5) Based on the negative-response snapshot preparation result ("NOK"), the VIM/cloud rejects snapshot creation. That is, the VIM/cloud causes that the requested snapshot is not created, but the procedure is ended without any action in terms of actual snapshot creation.

Figure 4:
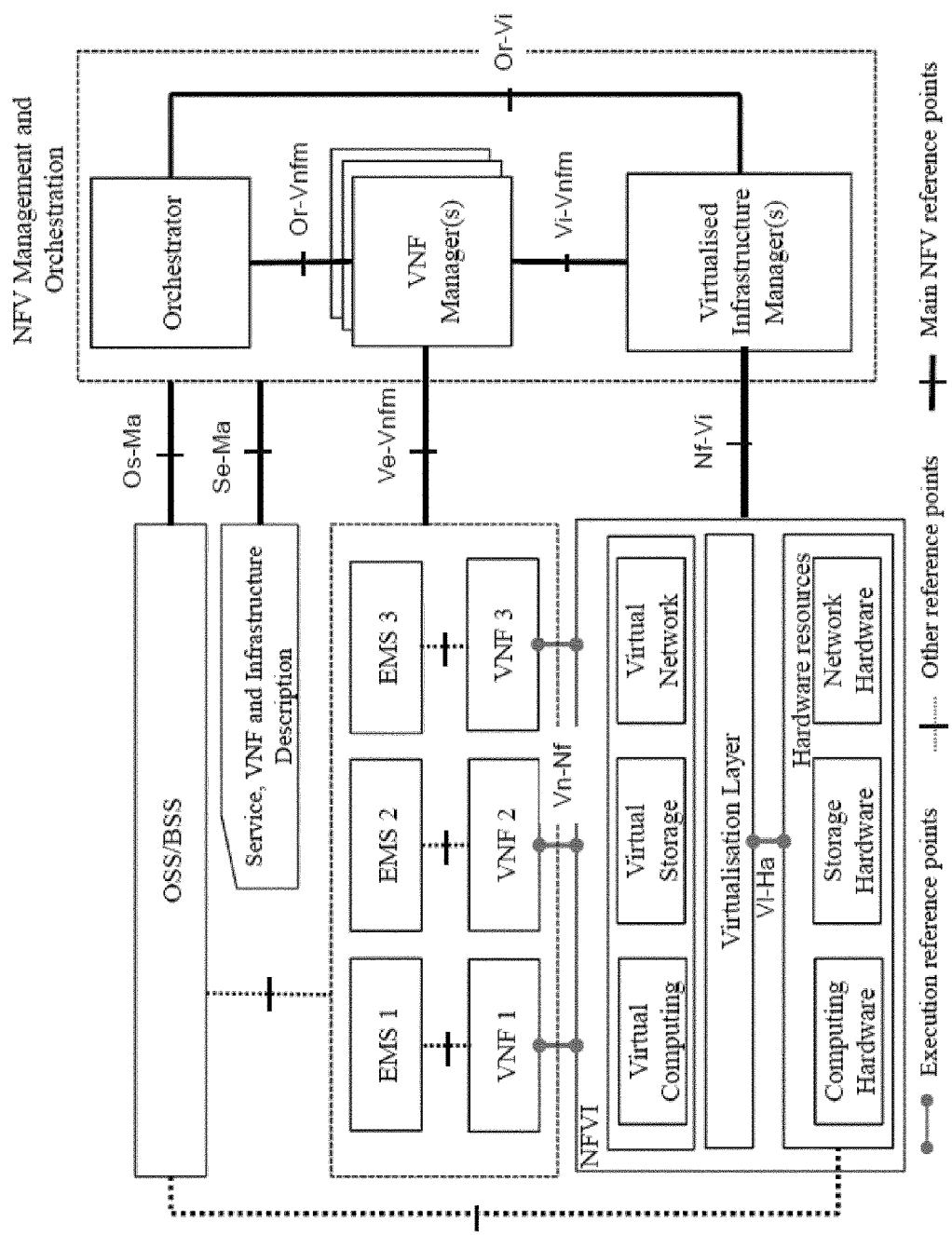
FIG. 4 shows a schematic diagram illustrating an architectural framework of a network functions virtualization system, for which at least one exemplifying embodiment of the present invention is applicable.

FIG. 4 shows a schematic diagram illustrating an architectural framework of a network functions virtualization system, for which at least one exemplifying embodiment of the present invention is applicable.

The exemplary illustration of FIG. 4 corresponds to the architectural framework of ETSI NFV, as specified in ETSI GS NFV 002 V1.1.1 (2013-10). Accordingly, for details thereof, reference is made to this document.

With reference to the exemplary ETSI NFV architectural framework illustrated in FIG. 4, the virtual manager (entity) according to at least one exemplifying embodiment of the present invention may be or may be comprised in or may comprise any one of an EMS instance, a VNF Manager instance and a VIM instance, and virtual machine (entity) according to at least one exemplifying embodiment of the present invention may be or may be comprised in or may comprise any one of a VNF instance or a VNF component therein.

In the following, example procedures according to exemplifying embodiments of the present invention are described, which are applied in the exemplary ETSI NFV architectural framework illustrated in FIG. 4. Yet, it is to be noted that exemplifying embodiments of the present invention are generally applicable to any network virtualization system. Accordingly, the thus illustrated reference points Vi-Vnfm and Ve-Vnfm are also to be considered as a mere example, while any reference point/s or interface/s between any suitable entities are generally applicable for executing the exemplified procedure.

As an example, the virtual manager is exemplarily assumed to be represented by/at the VIM, and the virtual machine is exemplarily assumed to be represented by/at the VNFC component X. Yet, it is noted that exemplifying embodiments of the present invention are not limited to such configuration.

Figure 5:
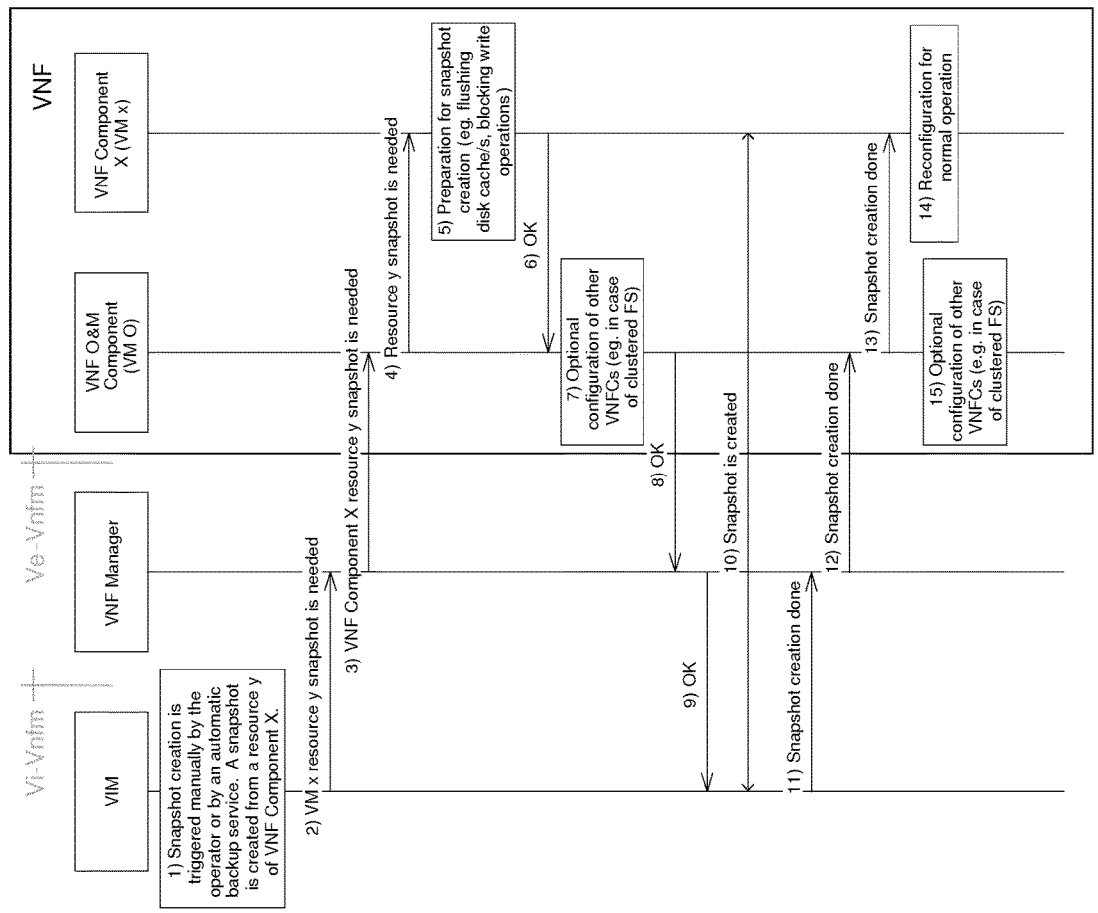
FIG. 5 shows a flow diagram illustrating a first example of a procedure under the architectural framework shown in FIG. 4 according to at least one exemplifying embodiment of the present invention.

FIG. 5 shows a flow diagram illustrating a first example of a procedure under the architectural framework shown in FIG. 4 according to at least one exemplifying embodiment of the present invention. The exemplary procedure of FIG. 5 refers to successful snapshot creation in a case of indirect communication between the virtual manager and the virtual machine.

As shown in FIG. 5, an exemplary procedure of successful snapshot creation according to at least one exemplifying embodiment of the present invention may comprise the following operations.

1) Snapshot creation is triggered in the VIM. Such trigger may occur either by an automatic event, e.g. via the API of the VIM, or a manual (human-triggered) event. In this example, the trigger (or request) refers, at least, to a requested snapshot of a resource y of VNFC X (VM x).
2) The VIM notifies the VNF Manager, which is responsible for VNFC X (VM x), about the requested snapshot creation by way of a snapshot creation notification. The identifier of the virtual machine in question (here, the identifier of VM x) and (an identifier or denomination of) the resource to be snapshotted (here, resource y) is contained or referenced in the notification.
3) The VNF Manager selects the correct VNFC (and, optionally, also an appropriate method or way) to notify about the requested snapshot creation, i.e. the target for forwarding the snapshot creation notification. In this example, the VNF Manager converts the identifier of VM x to an identifier of VNFC X. Then, the VNF Manager forwards the snapshot creation notification with the identifier of VNFC X to VM O, i.e. a VNF O&M component of the target virtual machine for the requested snapshot creation.
4) The VNFC O&M component (VM O) forwards the snapshot creation notification to the identified target virtual machine for the requested snapshot creation, i.e. VNFC X.
5) The VNFC X performs preparation for the requested snapshot creation, since it is assumed here that snapshot creation and preparation are acceptable. The actual steps of the related snapshot preparation processing are dependent from the architecture of the target virtual machine for the requested snapshot creation, i.e. the VNF and/or the VNFC, and/or the target resource or target resource type.
6) In this example, it is assumed that the applicable snapshot preparation processing is successfully performed such that the VNFC X is shifted to the snapshot preparation mode. Hence, the VNFC X sends back an acknowledgement of the snapshot creation/preparation, i.e. a positive-response snapshot preparation result ("OK"), to the VNFC O&M component.
7) As indicated here, the VNFC O&M component may optionally initiate further preparations for the requested snapshot creation at one or more other target virtual machines for the requested snapshot creation, e.g. VNFCs, if any.
8) The VNFC O&M component sends back the acknowledgement of the snapshot creation/preparation, i.e. a positive-response snapshot preparation result ("OK"), to the VNFC Manager.
9) The VNFC Manager sends back the acknowledgement of the snapshot creation/preparation, i.e. a positive-response snapshot preparation result ("OK"), to the VIM.
10) Based on the positive-response snapshot preparation result ("OK"), the VIM performs snapshot creation. That is, the VIM causes that the requested snapshot is created with respect to resource y of VNFC X (VM x), as well as other resources/VMs, if any.
11) After creation of the requested snapshot, the VIM sends a notification about the completion of snapshot creation, i.e. a snapshot completion notification, to the VNF Manager.
12) The VNF Manager forwards the snapshot completion notification to the VNF O&M component.
13) The VNF O&M component forwards the snapshot completion notification to the VNFC X.
14) Based on the snapshot completion notification, the VNFC X performs reconfiguration for normal operation. That is, the VNFC X perform snapshot preparation cancellation such that the VNFC X is shifted to the normal operation mode.

15) As indicated here, the VNFC O&M component may optionally initiate further reconfigurations for normal operation at the one or more other target virtual machines initiated for snapshot preparation in preceding step 7, if any.

Figure 6:
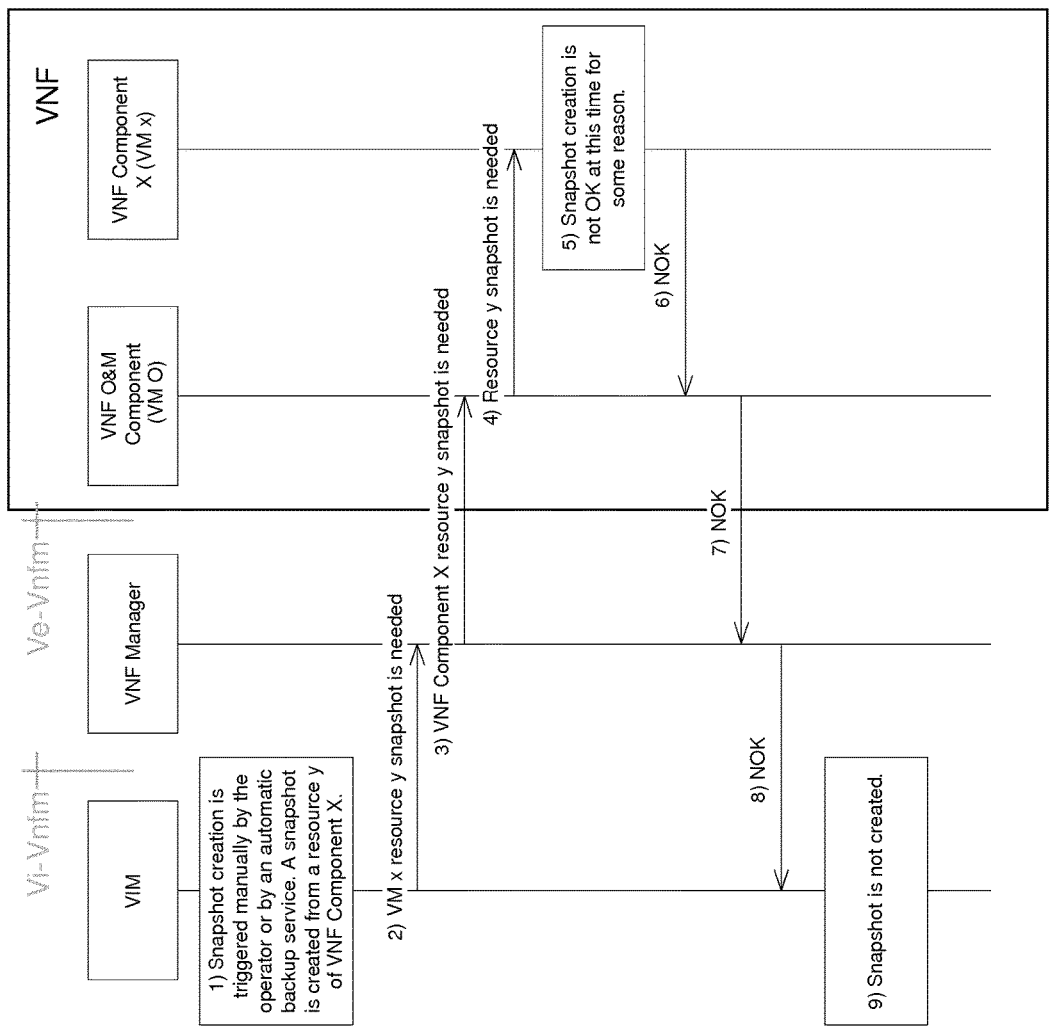
FIG. 6 shows a flow diagram illustrating a second example of a procedure under the architectural framework shown in FIG. 4 according to at least one exemplifying embodiment of the present invention.

FIG. 6 shows a flow diagram illustrating a second example of a procedure under the architectural framework shown in FIG. 4 according to at least one exemplifying embodiment of the present invention. The exemplary procedure of FIG. 6 refers to rejected snapshot creation in a case of indirect communication between the virtual manager and the virtual machine.

As shown in FIG. 6, an exemplary procedure of rejected snapshot creation according to at least one exemplifying embodiment of the present invention may comprise the following operations.

1) Snapshot creation is triggered in the VIM. Such trigger may occur either by an automatic event, e.g. via the API of the VIM, or a manual (human-triggered) event. In this example, the trigger (or request) refers, at least, to a requested snapshot of a resource y of VNFC X (VM x).
2) The VIM notifies the VNF Manager, which is responsible for VNFC X (VM x), about the requested snapshot creation by way of a snapshot creation notification. The identifier of the virtual machine in question (here, the identifier of VM x) and (an identifier or denomination of) the resource to be snapshotted (here, resource y) is contained or referenced in the notification.
3) The VNF Manager selects the correct VNFC (and, optionally, also an appropriate method or way) to notify about the requested snapshot creation, i.e. the target for forwarding the snapshot creation notification. In this example, the VNF Manager converts the identifier of VM x to an identifier of VNFC X. Then, the VNF Manager forwards the snapshot creation notification with the identifier of VNFC X to VM O, i.e. a VNF O&M component of the target virtual machine for the requested snapshot creation.
4) The VNFC O&M component (VM O) forwards the snapshot creation notification to the identified target virtual machine for the requested snapshot creation, i.e. VNFC X.
5) The VNFC X denies preparation for the requested snapshot creation, since it is assumed here that snapshot creation and/or preparation are not acceptable. Such non-acceptability may result from an ongoing operation, such as a write operation, which must or should not be interrupted, or a lack of authorization.
6) In this example, it is assumed that the applicable snapshot preparation processing is not performed such that the VNFC X is not shifted to the snapshot preparation mode but remains in the normal operation mode. Hence, the VNFC X sends back a disapproval of the snapshot creation/preparation, i.e. a negative-response snapshot preparation result ("NOK"), to the VNFC O&M component.
7) The VNFC O&M component sends back the disapproval of the snapshot creation/preparation, i.e. a negative-response snapshot preparation result ("NOK"), to the VNFC Manager.
8) The VNFC Manager sends back the disapproval of the snapshot creation/preparation, i.e. a negative-response snapshot preparation result ("NOK"), to the VIM.
9) Based on the negative-response snapshot preparation result ("NOK"), the VIM rejects snapshot creation. That is, the VIM causes that the requested snapshot is not created, but the procedure is ended without any action in terms of actual snapshot creation.

In view of the above-described examples and the non-limitation of exemplifying embodiments of the present invention thereto, the following is noted (in a non-exhaustive manner):

The snapshot creation notification can be sent directly from the VIM to the VM. This may be applicable in an ETSI NFV environment (e.g. when the virtual manager is represented by an EMS instance, or the VNF Manager and/or the VNF O&M component are not involved) or in a non-ETSI virtual network environment.

In the above examples, it is described that the VNFC O&M component performs coordination between a number of target virtual machines subject to one or more snapshot requests. Yet, such coordination is not required when the notification-originating/generating provides individual notifications for any target virtual machines, or such coordination can equally be performed at another entity, such as the VIM or the VNF Manager or one of the target virtual machines (VN-FCs).

In an ETSI NFV environment, it might happen that a VNFC O&M component needs to be notified even if the requested snapshot is to be created on another VNFC, as illustrated in the above examples. Yet, such VNFC O&M component or other corresponding entity does not need to be involved, neither in an ETSI NFV environment nor in a non-ETSI virtual network environment.

The resource to be snapshotted is described to be a resource of a virtual machine, but may more specifically be a resource of a guest system of/on the virtual machine. The above exemplified VNF Manager may be the managing entity of the virtual machine as such, or the manager of this guest system of the virtual machine.

By virtue of exemplifying embodiments of the present invention, as evident from the above, efficient snapshot creation in virtual network environment can be enabled/realized. More specifically, creation of consistent snapshots of a resource of a virtual machine of a virtual network environment in an automated manner can be ensured. That is, the present invention and its embodiments is effective for achieving automatic and consistent snapshot creation in any kind of virtual network environment.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 7 and 8, while for the sake of brevity reference is made to the detailed description of respective corresponding configurations/setups, schemes, methods and functionality, principles and operations according to FIGS. 1 to 6.

Figure 7:
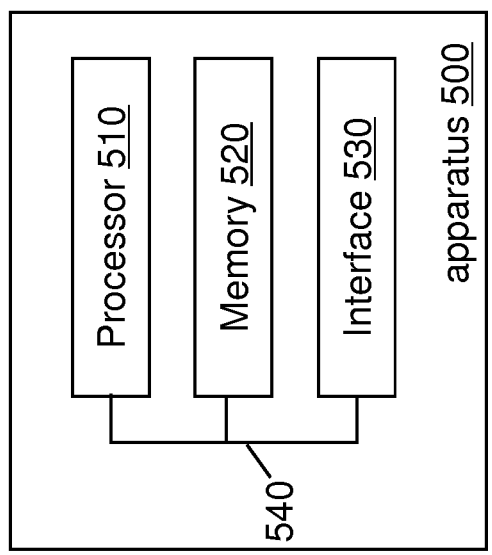
FIG. 7 shows a schematic diagram illustrating an example of a structure of apparatuses according to at least one exemplifying embodiment of the present invention.
Figure 8:
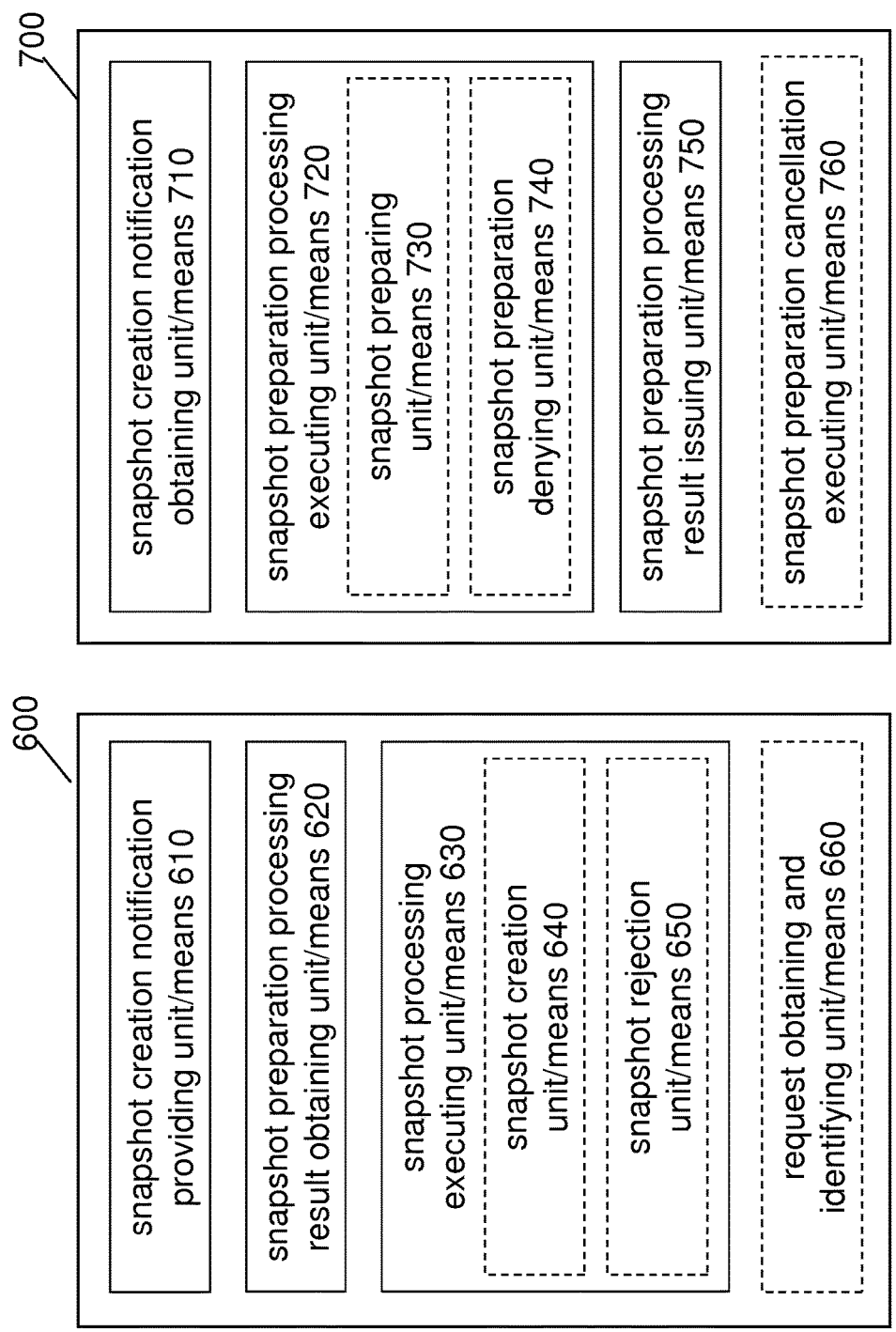
FIG. 8 shows a schematic diagram illustrating another example of a functional structure of apparatuses according to at least one exemplifying embodiment of the present invention.

In FIGS. 7 and 8, the blocks are basically configured to perform respective methods, procedures and/or functions as described above. The entirety of blocks are basically configured to perform the methods, procedures and/or functions as described above, respectively. With respect to FIGS. 7 and 8, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 7 and 8, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 7 shows a schematic diagram illustrating an example of a structure of apparatuses according to at least one exemplifying embodiment of the present invention.

As indicated in FIG. 7, according to exemplifying embodiments of the present invention, an apparatus 500 may comprise at least one processor 510 and at least one memory 520 (and possibly also at least one interface 530), which may be operationally connected or coupled, for example by a bus 540 or the like, respectively.

The processor 510 of the apparatus 500 can be any suitable computing means, including hardware circuitry and/or software code (e.g. stored in or read from the memory 520). The interface 530 of the apparatus 500 can be a suitable transmitter, receiver or transceiver connected to a network of computing equipment including any kind of communication-enabled entities, apparatuses or devices. The interface 530 of the apparatus 500 is generally configured to communicate with at least one other apparatus, device, node or entity (in particular, the interface thereof).

The memory 520 of the apparatus 500 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 520 of the apparatus 500 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 500 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present invention, the thus illustrated apparatus 500 may represent or realize/embody a (part of a) virtual manager entity of a virtual network environment, also referred to as virtual manager herein. Specifically, the thus illustrated apparatus 500 may be configured to perform a procedure and/or exhibit a functionality and/or implement a mechanism, as described for the virtual manager in FIG. 1 and/or for the cloud in any one of FIGS. 2 and 3 and/or for the VIM in any one of FIGS. 5 and 6 (while it is to be noted that the thus described mechanism could equally be realized by a VNF Manager or an EMS, or any comparable entity, irrespective of its implementation or related standard).

Accordingly, the apparatus 500 may be caused or the apparatus 500 or its at least one processor 510 (possibly together with computer program code stored in its at least one memory 520), in its most basic form, is configured to provide a notification of requested snapshot creation of a resource of a virtual machine entity in the virtual network environment for the virtual machine entity, obtain a result of snapshot preparation processing by the virtual machine entity, and execute snapshot processing on the basis of the obtained snapshot preparation result.

According to exemplifying embodiments of the present invention, the thus illustrated apparatus 500 may represent or realize/embody a (part of a) virtual machine entity of a virtual network environment, also referred to as virtual machine herein. Specifically, the thus illustrated apparatus 500 may be configured to perform a procedure and/or exhibit a functionality and/or implement a mechanism, as described for the machine in FIG. 1 and/or for the cloud in any one of FIGS. 2 and 3 and/or for the VNFC X in any one of FIGS. 5 and 6 (while it is to be noted that the thus described mechanism could equally be realized by any comparable entity, irrespective of its implementation or related standard).

Accordingly, the apparatus 500 may be caused or the apparatus 500 or its at least one processor 510 (possibly together with computer program code stored in its at least one memory 520), in its most basic form, is configured to obtain a notification of requested snapshot creation of a resource of the virtual machine entity from a virtual manager entity of the virtual network environment, execute snapshot preparation processing in response to the snapshot creation notification, and issue a result of the snapshot preparation processing for the virtual manager entity.

As mentioned above, any apparatus or entity according to exemplifying embodiments of the present invention may be structured by comprising respective units or means for performing corresponding operations, procedures and/or functions. For example, such units or means may be implemented/realized on the basis of an apparatus structure, as exemplified in FIG. 7, i.e. by one or more processors 510, one or more memories 520, one or more interfaces 530, or any combination thereof.

FIG. 8 shows a schematic diagram illustrating another example of a functional structure of apparatuses according to at least one exemplifying embodiment of the present invention.

It is to be noted that the individual apparatuses shown in FIG. 8 are inherently independent from each other but could be operable to interwork, i.e. exemplifying embodiments of the present invention cover any one of these apparatuses alone or any combination of such apparatuses (including one or more of any one of these apparatuses).

As shown in FIG. 8, an apparatus 600 according to exemplifying embodiments of the present invention may represent a (part of a) virtual manager entity of a virtual network environment, also referred to as virtual manager herein. Such apparatus may comprise (at least) a unit or means for providing a notification of requested snapshot creation of a resource of a virtual machine entity in the virtual network environment for the virtual machine entity (denoted as snapshot creation notification providing unit/means 610), a unit or means for obtaining a result of snapshot preparation processing by the virtual machine entity (denoted as snapshot preparation processing result obtaining unit/means 620), and a unit or means for executing snapshot processing on the basis of the obtained snapshot preparation result (denoted as snapshot processing executing unit/means 630).

As evident from the above, the snapshot processing executing unit/means 630 may optionally comprise a unit or means for performing snapshot creation (denoted as snapshot creation unit/means 640) and a unit or means for rejecting snapshot creation (denoted as snapshot rejection unit/means 650). Further, the apparatus 600 may optionally also comprise a unit or means for obtaining a request for snapshot creation and identifying at least one of the virtual machine entity, the resource for snapshot creation and another entity for transferring the notification towards the virtual machine entity on the basis of the obtained request (denoted as request obtaining and identifying unit/means 660).

As shown in FIG. 8, an apparatus 700 according to exemplifying embodiments of the present invention may represent a (part of a) virtual machine entity of a virtual network environment, also referred to as virtual machine herein. Such apparatus may comprise (at least) a unit or means for obtaining a notification of requested snapshot creation of a resource of the virtual machine entity from a virtual manager entity of the virtual network environment (denoted as snapshot creation notification obtaining unit/means 710), a unit or means for executing snapshot preparation processing in response to the snapshot creation notification (denoted as snapshot preparation processing executing unit/means 720), and a unit or means for issuing a result of the snapshot preparation processing for the virtual manager entity (denoted as snapshot preparation processing issuing unit/mearis 750).

As evident from the above, the snapshot preparation processing executing unit/means 720 may optionally comprise a unit or means for performing snapshot preparation (denoted as snapshot preparing unit/means 730) and a unit or means for denying snapshot preparation (denoted as snapshot preparation denying unit/means 740). Further, the apparatus 700 may optionally also comprise a unit or means for obtaining a notification of completed snapshot creation and executing snapshot preparation cancellation in response to the snapshot completion notification (denoted as snapshot preparation cancellation executing unit/means 760).

For further details regarding the operability/functionality of the individual apparatuses (or units/means thereof) according to exemplifying embodiments of the present invention, reference is made to the above description in connection with any one of FIGS. 1 to 6, respectively.

According to exemplifying embodiments of the present invention, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted apparatuses and/or entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing efficient snapshot creation in virtual network environment, especially for ensuring creation of consistent snapshots in an automated manner. Such measures exemplarily comprise that a virtual manager entity provides a notification of requested snapshot creation of a resource of a virtual machine entity for the virtual machine entity, the virtual machine entity executes snapshot preparation processing in response to the snapshot creation notification from the virtual manager entity, and the virtual manager entity executes snapshot processing on the basis of a snapshot preparation result provided by the virtual machine entity.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

| | |
|---|---|
| 3GPP | 3rd Generation Partnership Project |
| API | Application Programming Interface |
| BSS | Business Support System |
| EMS | Element Management System |
| ETSI | European Telecommunications Standards Institute |
| FS | File System |
| LTE | Long Term Evolution |
| NFV | Network Functions Virtualization |
| NFVI | Network Functions Virtualization Infrastructure |
| O&M | Operations and Maintenance |
| OSS | Operations Support System |
| SDN | Software Defined Networking |
| VIM | Virtual Infrastructure Manager |
| VM | Virtual Machine |
| VNF | Virtual Network Function |
| VNFC | Virtual Network Function Component |
| VNFM | Virtual Network Function Manager |

The invention claimed is:

1. A method comprising
identifying at least one virtual machine entity, and at least one resource of the at least one virtual machine entity to be a subject of snapshot creation,
providing, by a virtual manager entity of a virtual network environment via at least one virtual network function manager interface, a notification of requested snapshot creation of a resource of a virtual machine entity in the virtual network environment for the virtual machine entity, the notification comprising an identifier of the virtual machine entity and an identifier of the resource,
wherein the virtual manager entity is configured to trigger the notification of requested snapshot creation in response to receiving a request from another entity communicatively coupled to the virtual manager entity,
obtaining, at the virtual manager entity, a result of snapshot preparation processing by the virtual machine entity,
executing, by the virtual manager entity, snapshot processing on the basis of the obtained snapshot preparation result, and
obtaining, at the virtual manager entity, a snapshot preparation cancellation notification from the virtual machine entity via the at least one virtual network function manager interface, wherein the snapshot preparation cancellation notification notifies the virtual manager entity that the virtual machine entity has resumed normal operation;
wherein when the notification of requested snapshot creation is triggered in response to receiving the request from another entity communicatively coupled to the virtual manager entity, the virtual manager entity informs the another entity of the cancellation notification.

2. The method according to claim 1, wherein
when the snapshot preparation result indicates that the virtual machine entity has performed preparation for the requested snapshot creation, the snapshot processing comprises creating the requested snapshot and providing a notification of completed snapshot creation after creating the requested snapshot.

3. The method according to claim 1, wherein
when the snapshot preparation result indicates that the virtual machine entity has denied preparation for the requested snapshot creation, the snapshot processing comprises rejecting the requested snapshot.

4. The method according to claim 1, wherein
the notification of requested snapshot creation is operable as a trigger for initiating snapshot preparation processing at the virtual machine entity.

5. The method according to claim 1, wherein
the notification of requested snapshot creation is triggered by an automatic event or a manual event at the virtual manager entity or with the another entity communicatively coupled to the virtual manager entity.

6. The method according to claim 1, wherein
the resource subject to requested snapshot creation comprises a storage disk or a memory of the virtual machine entity.

7. The method according to claim 1, wherein
the virtual machine entity comprises a host system and a guest system, wherein the guest system is hosted by the host system,
the resource subject to requested snapshot creation belongs to the guest system of the virtual machine entity, and
the guest system is configured to implement a functionality of a network element virtualized in the virtual machine entity.

8. The method according claim 1, further comprising
obtaining, at the virtual manager entity, a request for snapshot creation, and
identifying, by the virtual manager entity, at least one of the virtual machine entity, the resource for snapshot creation, or another entity for transferring the notification towards the virtual machine entity on the basis of the obtained request.

9. The method according to claim 1, wherein
the virtual network environment is implemented in a software defined networking architecture or a network functions virtualization architecture, and/or
the virtual manager entity comprises or is comprised in at least one of a virtual infrastructure manager, a virtual network function manager, or an element management system, and/or
the virtual machine entity comprises or is comprised in a virtual network function component, and/or
the requested snapshot refers to information relating to a network element virtualized in the virtual machine entity, such as one or more of virtual links, data, and control and/or management planes to other related virtualized network elements.

10. A method comprising
obtaining, at a virtual machine entity of a virtual network environment via at least one virtual network function manager interface, a notification of requested snapshot creation of a resource of the virtual machine entity from a virtual manager entity of the virtual network environment, the notification comprising an identifier of the virtual machine entity and an identifier of the resource,
executing, at the virtual machine entity, snapshot preparation processing in response to the snapshot creation notification,
wherein the snapshot preparation processing comprises determining, by the virtual machine entity, whether preparation for the requested snapshot and creation of the requested snapshot are acceptable based on one or more of: an ongoing operation of the virtual machine entity that is not to be interrupted, or whether the notification of the requested snapshot creation is authorized,
issuing, by the virtual machine entity, a result of the snapshot preparation processing for the virtual manager entity via the at least one virtual network function manager interface, and
shifting to a snapshot preparation mode during snapshot preparation processing, and shifting to a normal operation mode following the cancellation of preparation for the requested snapshot.

11. The method according to claim 10, wherein
the notification of requested snapshot creation is operable as a trigger for initiating snapshot preparation processing at the virtual machine entity.

12. The method according to claim 10, wherein
when preparation for the requested snapshot and creation of the requested snapshot are determined as acceptable, the snapshot preparation processing further comprises performing preparation for the requested snapshot creation, and the snapshot preparation result indicates that the virtual machine entity has performed preparation for the requested snapshot creation.

13. The method according to claim 12, further comprising
obtaining, at the virtual machine entity, a notification of completed snapshot creation from the virtual manager entity, and
executing, by the virtual machine entity, snapshot preparation cancellation in response to the snapshot completion notification.

14. The method according to claim 10, wherein
when at least one of preparation for the requested snapshot or creation of the requested snapshot is determined as not acceptable, the snapshot preparation processing further comprises denying preparation for the requested snapshot creation, and the snapshot preparation result indicates that the virtual machine entity has denied preparation for the requested snapshot creation.

15. The method according to claim 10, wherein
the resource subject to requested snapshot creation comprises a storage disk or a memory of the virtual machine entity.

16. The method according to claim 15, wherein
when the resource subject to requested snapshot creation comprises a storage disk, preparation for the requested snapshot comprises at least one of flushing one or more caches to the storage disk, disabling write operations to the storage disk and configuring clusters of a clustered file system of the virtual machine entity, and/or cancellation of preparation for the requested snapshot comprises at least enabling write operations to the storage disk, and/or
when the resource subject to requested snapshot creation comprises a memory, preparation for the requested snapshot comprises at least disabling write operations to the memory, and/or cancellation of preparation for the requested snapshot comprises at least enabling write operations to the memory.

17. The method according to claim 10, wherein
the virtual machine entity comprises a host system and a guest system, wherein the guest system is hosted by the host system, and
the resource subject to requested snapshot creation belongs to the guest system of the virtual machine entity.

18. An apparatus comprising
at least one processor and at least one non-transitory memory including a computer program code, wherein the at least one non-transitory memory and the computer program code are configured, with the at least one processor, to cause the apparatus to perform at least the following:
identifying at least one virtual machine entity, and at least one resource of the at least one virtual machine entity to be a subject of snapshot creation,
providing, by a virtual manager entity of a virtual network environment via at least one virtual network function manager interface, a notification of requested snapshot creation of a resource of a virtual machine entity in the virtual network environment for the virtual machine entity, the notification comprising an identifier of the virtual machine entity and an identifier of the resource,
wherein the virtual manager entity is configured to trigger the notification of requested snapshot creation in response to receiving a request from another entity communicatively coupled to the virtual manager entity,
obtaining, at the virtual manager entity, a result of snapshot preparation processing by the virtual machine entity,
executing, by the virtual manager entity, snapshot processing on the basis of the obtained snapshot preparation result, and
obtaining, at the virtual manager entity, a snapshot preparation cancellation notification from the virtual machine entity via the at least one virtual network function manager interface, wherein the snapshot preparation cancellation notification notifies the virtual manager entity that the virtual machine entity has resumed normal operation,
wherein when the notification of requested snapshot creation is triggered in response to receiving the request from another entity communicatively coupled to the virtual manager entity, the virtual manager entity informs the another entity of the cancellation notification.

19. An apparatus comprising
at least one processor and at least one non-transitory memory including a computer program code, wherein the at least one non-transitory memory and the computer program code are configured, with the at least one processor, to cause the apparatus to perform at least the following:
obtaining, at a virtual machine entity of a virtual network environment via at least one virtual network function manager interface, a notification of requested snapshot creation of a resource of the virtual machine entity from a virtual manager entity of the virtual network environment, the notification comprising an identifier of the virtual machine entity and an identifier of the resource, executing, at the virtual machine entity, snapshot preparation processing in response to the snapshot creation notification, wherein the snapshot preparation processing comprises determining whether preparation for the requested snapshot and creation of the requested snapshot are acceptable based on one or more of: an ongoing operation of the virtual machine entity that is not to be interrupted, or whether the notification of the requested snapshot creation is authorized, issuing, by the virtual machine entity, a result of the snapshot preparation processing for the virtual manager entity via the at least one virtual network function manager interface, and shifting to a snapshot preparation mode during snapshot preparation processing, and shifting to a normal operation mode following the cancellation of preparation for the requested snapshot.

20. The method of claim 10, wherein a virtual network function component operations and maintenance component performs coordination between a plurality of target virtual machines that may be subject to the notification of requested snapshot creation.

* * * * *